Jan. 24, 1967   F. X. LANDREY ETAL   3,300,028
ELEVATOR CONVEYOR
Filed March 25, 1965   3 Sheets-Sheet 1
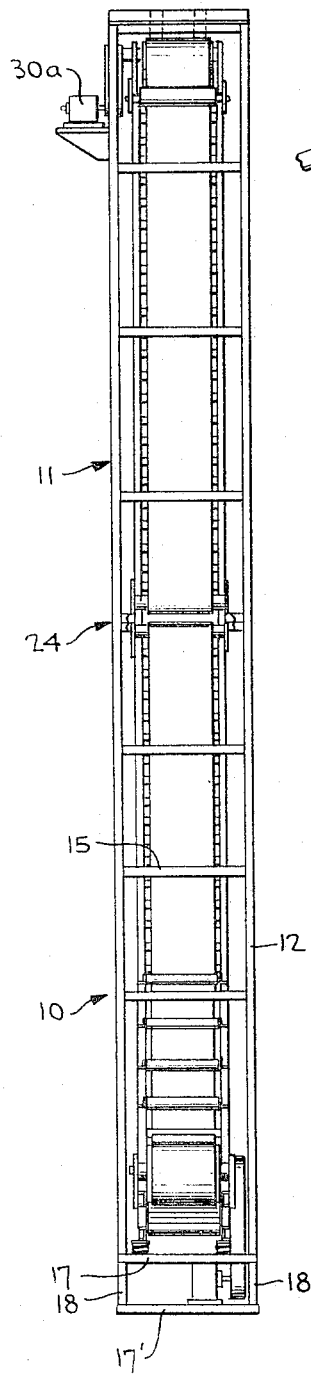
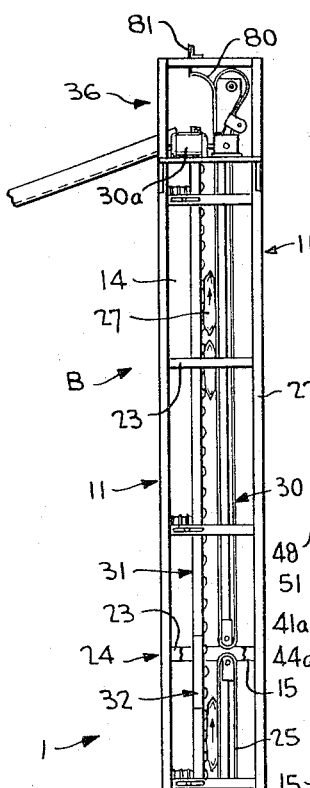
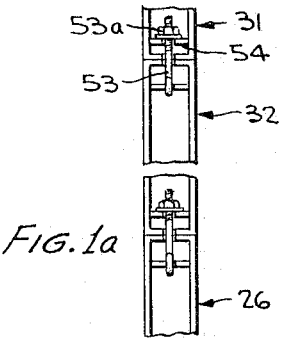
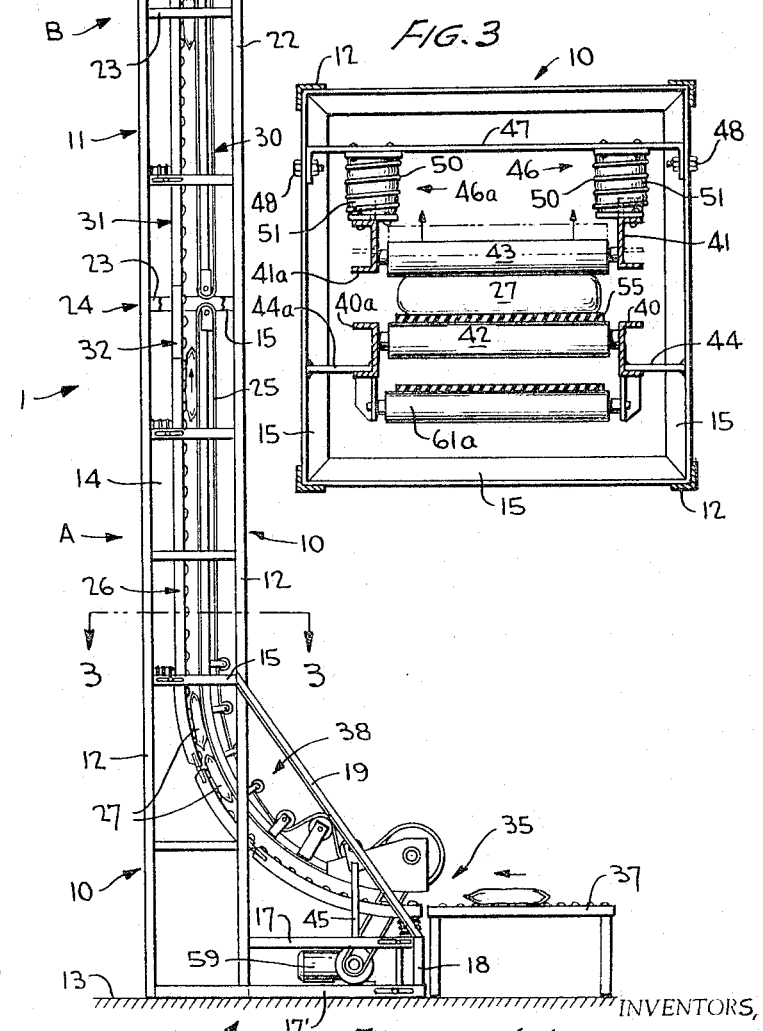
INVENTORS,
FRANCIS X. LANDREY
RAYMOND L. SNELL
BY *Watson, Cole, Grindle & Watson*
ATTORNEYS

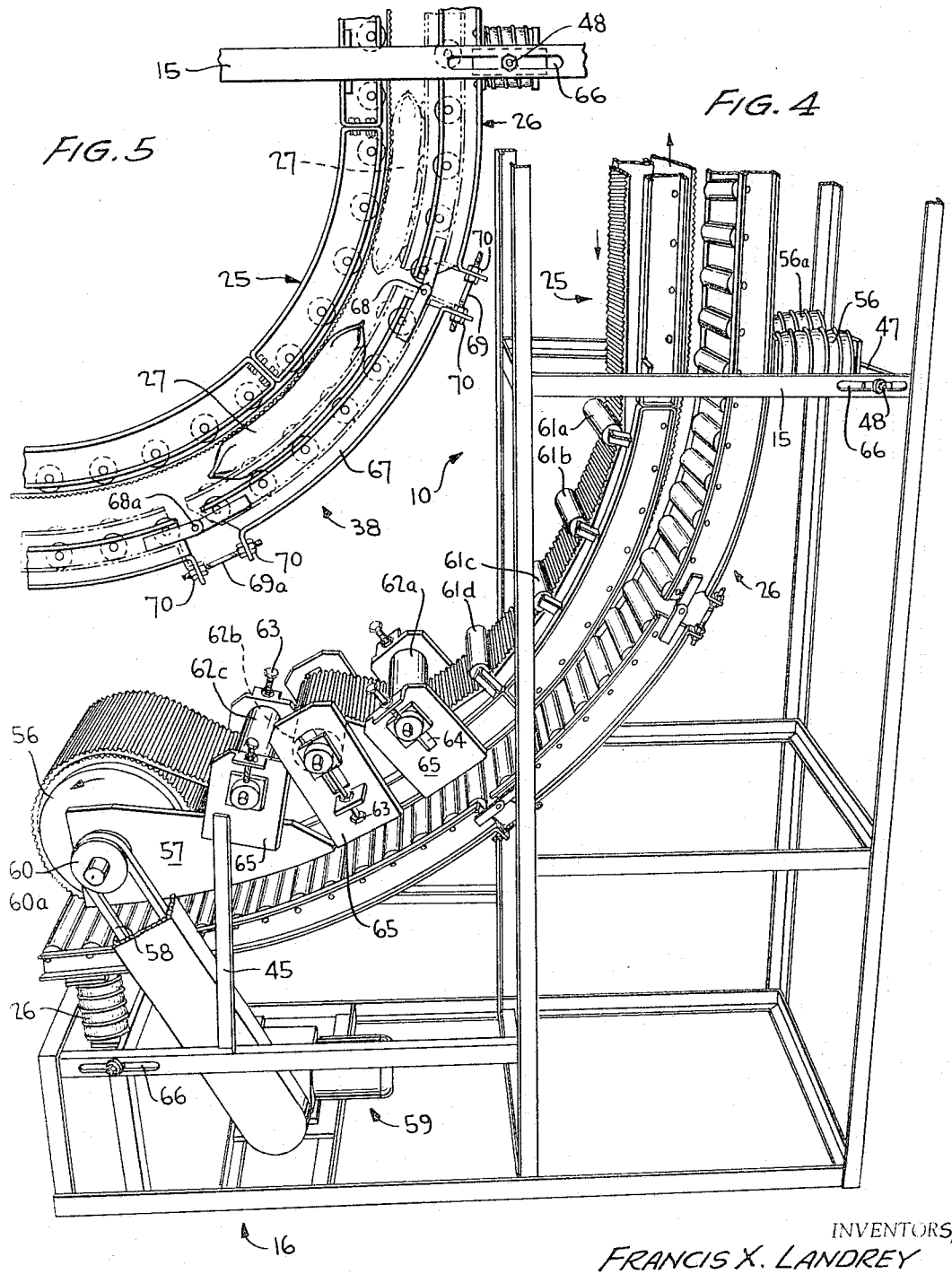

Jan. 24, 1967   F. X. LANDREY ETAL   3,300,028
ELEVATOR CONVEYOR
Filed March 25, 1965   3 Sheets-Sheet 3
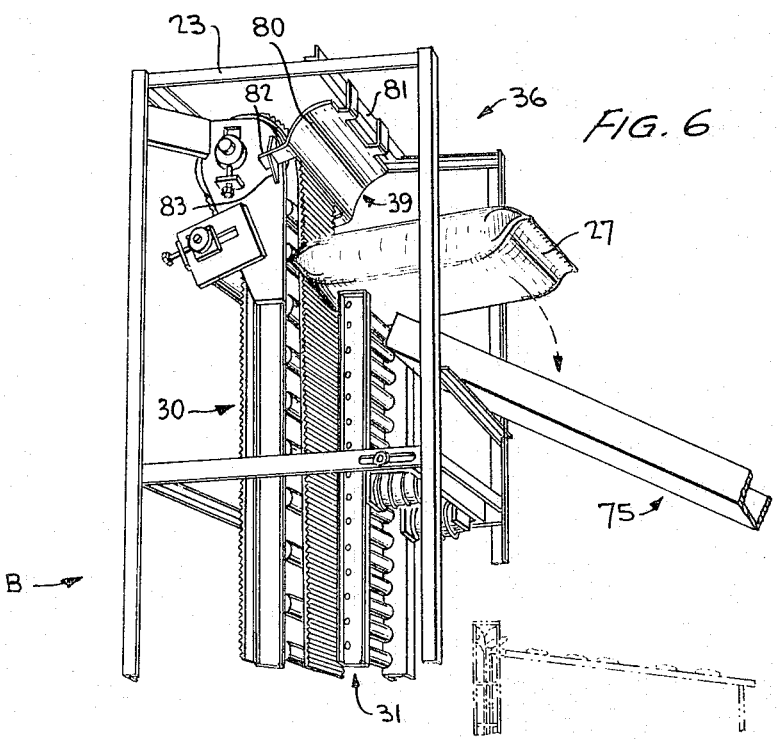
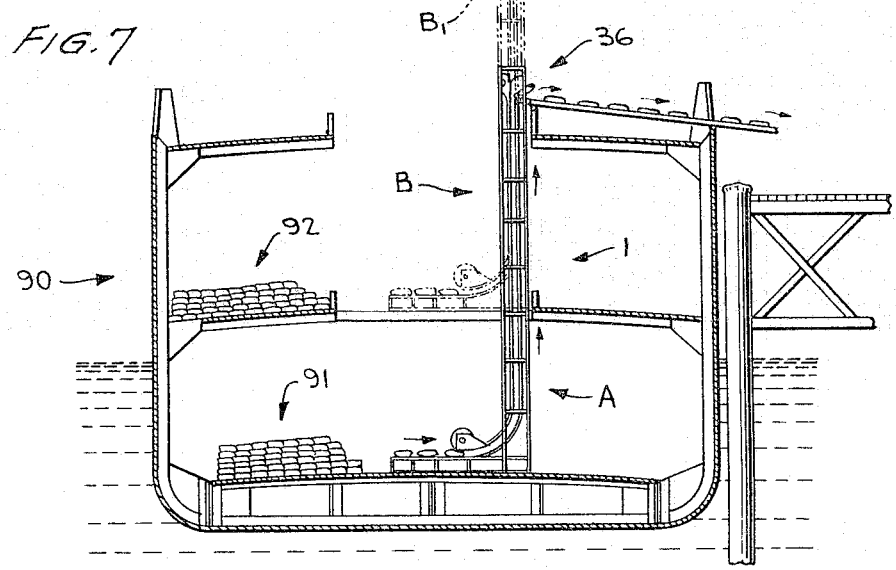
INVENTORS,
FRANCIS X. LANDREY
RAYMOND L. SNELL
BY *Watson, Cole, Grindle & Watson*
ATTORNEYS

3,300,028
ELEVATOR CONVEYOR
Francis X. Landrey, 14 Delano Park, Cape Elizabeth, Maine 04107, and Raymond L. Snell, 19 Bristol St., Portland, Maine 04102
Filed Mar. 25, 1965, Ser. No. 442,608
10 Claims. (Cl. 198—160)

The present invention relates to elevator apparatus and, more particularly, to a portable elevator of the type utilizing opposed conveyors to effect the conveying of a series of generally flat articles from one elevation to another.

In many instances, it is desirable to be able to quickly and efficiently provide an elevator in a location to convey successive articles, such as bags of material, in either an upward or downward direction. For example, when loading or unloading the hold of a ship, it is necessary to provide a structure that can easily be positioned at various levels of the hold of the ship and can rapidly convey successive articles to effect the loading or unloading process.

Accordingly, it is one object of this invention to provide a portable elevator of the character described which will rapidly and efficiently convey a series of articles.

To accomplish this end, the apparatus of the present invention provides an elevator of the opposed conveyor type wherein the conveyors are mounted in an elongated frame which is supported in an upright position and forms a shaft for the elevator. According to the invention, this elevator can be used singly or in combination with other elevators of similar design in a very advantageous manner. More particularly, each elevator is constructed in such a manner as to have a sturdy frame forming an elevator shaft to enclose the opposed conveyors to enable the units to be easily transported from one location of use to another since the frame forms a protective shield around the moving parts of the conveyors to protect same from bumps and jars that might be incurred during such transporting operation. The portable frame of the present invention is such as to be easily connected to other units of an elevator assembly and is additionally of a design which can withstand the large force required to grip the articles being conveyed between the opposed conveyors.

An additional feature of the present invention involves the mounting of the opposed conveyors in the frame of the elevator so that successive bags of the same size which vary in shape due to being stacked one on top of the other for a period of time can be accommodated without any interruption in the conveying process. To accomplish this purpose, the power conveyor of the pair of opposed conveyors is fixedly mounted on the frame of the elevator while the other of the conveyors is of the idler type and is resiliently mounted so as to be urged toward the power conveyor whereby the articles along the feed path are clamped in driving engagement with an endless belt of the ribbed type on the power conveyor. Additionally, the idler conveyor of the pair is advantageously mounted for positive adjustment toward and away from the power conveyor to conform to different sized articles so that, for example, the same conveying apparatus may be utilized to transport a series of fifty-pound bags of material and then quickly and conveniently adjusted to transport another series of one-hundred pound bags. To provide a fine adjustment for the pressure clamping the vertically moving bags into driving engagement with the power belt, the present invention contemplates the use of a pneumatic bag means which cooperates with the resilient mounting means for the idler conveyor.

Another aspect of the invention is concerned with the arrangement of the receiving and discharge ends of the elevator. According to the invention, the conveyors on the receiving end of the feed path curve in a gradual arc to turn the articles for subsequent vertical movement; the idler conveyor in this case being formed in sections pivoted to one another so as to be capable of the required adjustment with relation to the power conveyor while still maintaining the proper arcual configuration. At the discharge end of each elevator, the idler conveyor terminates short of the end of the power conveyor and a novel deflecting means is provided for causing the leading edge of the bags to separate from the power belt to turn such bags for discharge. Then when it is desired to use a plurality of elevators in stacked relationship, an auxiliary conveyor section advantageously connects the juxtaposed ends of the corresponding idler conveyors in adjoining frames so that the feed path through the elevator shaft is continuous along one side; the power conveyors having their corresponding ends in adjoining frames in juxtaposed relation but being independent for separate operation.

Thus, it is another object of the present invention to provide an elevator of the type described having a portable frame which protects the conveyor parts and which is easily adapted to be stacked in end-to-end relationship to form an extended elevator shaft.

It is another object of this invention to provide an elevator unit of the proposed conveyor type wherein one conveyor is resiliently and adjustably mounted to accommodate a wide range of sizes or shapes of generally flat articles.

Still another object of the present invention is to provide an improved elevator construction which is simple in design and is thus easy to manufacture and low in cost while at the same time being particularly efficient in effecting the change in elevation of successive articles, such as bags of material.

Still another object of the present invention is to provide an apparatus that utilizes receiving and discharge arrangements which lend themselves to adjustment as well as association with other elevators of similar design in an efficient manner.

In this application, we have shown and described only the preferred embodiment of the invention, simply by way of illustration of the best mode contemplated by us of carrying out our invention. However, the invention is capable of other and different embodiments, and its several details are capable of modification in various obvious respects, all without departing from the invention. Accordingly, the drawings and description are to be regarded as illustrative in nature, and not as restrictive.

Referring to the drawings:

FIGURE 1 is a side elevational view of an elevator assembly constructed in accordance with the present invention;

FIGURE 1a is a detail view of a portion of the apparatus of FIG. 1;

FIG. 2 is a front elevation of the apparatus of FIGURE 1;

FIG. 3 is a sectional view taken along lines 3—3 of FIGURE 1;

FIG. 4 is a perspective view illustrating the curved receiving end of the apparatus of the present invention;

FIG. 5 is a detailed illustration of the opposed conveyor arrangement of FIG. 4 with parts omitted for ease of illustration;

FIG. 6 is an illustration of the discharge end of the apparatus of the present invention;

FIG. 7 illustrates a particular environment in which the apparatus of the present invention can be utilized.

Referring now to the drawings and first to the embodiment of the invention shown in FIGS. 1 and 2, an elevator assembly is illustrated generally represented by the reference numeral 1 and comprises a lower elevator unit A having a frame structure 10 and an upper elevator unit B having a frame structure 11 arranged in a stacked relationship as indicated. The lower unit frame structure 10 comprises suitable corner posts 12 extending in an upwardly fashion from a floor or support 13 and are secured together to form an enclosed elevator shaft 14 by means of cross-ties 15. In order to provide support for the elevator units A and B, a cantilever frame portion 16 extends outwardly from the bottom of the elevator shaft 14 and comprises horizontal frame members 17, 17' and end post 18 interconnecting the terminal ends of said horizontal members 17 and 17'. It is to be understood that the frame structure 10 is preferably a welded unit and may comprise other structure not specifically described above. If desired, for example, a diagonal member 19 is provided to strengthen the lower frame structure 10 by connecting the terminal ends of cantilever frame portion 16 to the corner post 12.

The upper frame structure 11 is constructed in a manner similar to the lower frame structure 10 just described and comprises corner posts 22 and cross-ties 23, which are suitably welded together to form the upper portion of the elevator shaft 14. The upper frame structure 11 is releasably connected to the lower frame structure 10 at a bolted joint 24 by any number of suitable bolts or other fastener means (not shown in any of the drawings), which bolts or fastener means engage the abutting cross-ties 15, 23 of the frame structures 10, 11, respectively.

The lower elevator unit has mounted within the frame structure 10 a pair of opposed conveyors comprising a power conveyor 25 and an idler conveyor 26. As is evident from the drawings, the conveyors 25, 26 are adapted to engage an article, such as bags 27, to be fed along a feed path defined by the opposing faces of the conveyors 25, 26.

The upper elevator unit B also has a pair of opposed conveyors including a power belt conveyor 30 driven by a suitable motor 30a and an idler conveyor 31, which are so positioned as to receive the bags 27 from the lower elevator unit A and continue to feed the same along the feed path defined by the conveyors 30, 31. More particularly, the corresponding power conveyors 25, 30 of the adjoining elevator units A, B have their ends in juxtaposition with an auxiliary conveyor section 32 actually interconnecting the idler conveyors 26, 31, as will be explained in detail later.

Thus, in brief, during the operation of the elevator assembly of the present invention, the bags 27 will be fed along the indicated feed path from a normal receiving station 35 to a normal discharge station 36 without interruption. Just downstream of the receiving station 35, the conveyors 25, 26 are curved in a gradual arc-like fashion to turn the bags 27 for vertical movement along the feed path after being received from a suitable source, such as feed table 37; this curved portion of the conveyors 25, 26 being generally designated by the reference numeral 38. At the discharge station 36, the bags 27 are turned for discharge by a deflector, represented generally by the reference numeral 39, which will be discussed in detail later.

It should be particularly noted at this point that the described conveying apparatus is advantageously mounted within the confines of the frame structures 10 and 11 whereby the elevator units A and B are particularly adaptable for portable use in that the entire working mechanism is protected from all bumps and jolts which might occur during the transporting operation of the units A, B. Furthermore, from the foregoing description, it can be seen that the elevator units A, B can be rapidly and conveniently connected by effecting coupling of the joint 24 and insertion of the auxiliary idler conveyor section 32.

The particular arrangement of mounting the conveyors 25, 26, 30, 31 within the frames 10, 11 brings about certain results and advantages which can best be described by referring to FIGURE 3 wherein the mounting of the conveyors 25, 26 in the lower frame structure 10 can be clearly seen. It will be understood that the upper conveyors 30, 31 are similarly mounted in the frame structure 11 and therefore the discussion of this aspect of the invention will be limited to the mounting of the conveyors 25, 26 in the lower frame structure 10 now to be described.

Each conveyor 25, 26 comprises a pair of spaced frame members 40, 40a and 41, 41a, respectively. These frame members 40, 40a and 41, 41a are preferably U-shaped and rotatably mount a series of rollers 42, 43 along the entire length of the respective conveyors 25, 26. The power conveyor frame members 40, 40a are secured to the frame structure 10 by inwardly extending ears 44, 44a, suitably positioned on opposed cross-ties 15, and by lower support post 45 extending upwardly from the cantilever frame portion 16 (see FIG. 1). The idler conveyor 26 is mounted for resilient movement toward and away from the power conveyor 25 by means of pneumatic-spring assemblies 46, 46a by engagement with a cross-bar 47, which in turn is mounted by bolts 48 along the same opposed cross-ties 15. The pneumatic spring assembly 46, 46a, according to the present invention, takes the form of a coil spring 50 to support the weight of the idler conveyor 26 and at the same time impart primary resilience to the same. Disposed within the confines of the coil spring 50 is provided a pneumatic bag 51 having suitable valve means 52 through which the bag 51 is adapted to be inflated to impart secondary resiliency to the conveyor 26 and to provide fine adjustment for the position of the rollers 43 along the feed path.

The auxiliary idler conveyor 32 is made secure to the main idler conveyors 26, 31 by suitable pivotal bolts 53 illustrated in FIGURE 1a and having cooperating nuts 53a. These bolts 53 are adapted to engage the slotted tongue 54 on the frame members 41, 41a of the cooperating conveyors 26, 31 and upon tightening of the nuts 53a down on the corresponding tongues 54, the idler conveyor 26, 32, 31 becomes integral from the top to bottom of the assembly 1 to provide a continuous path for the bags 27 regardless of the number of elevator units A, B being utilized.

Thus, considering the showing of FIGURE 3, it can be seen that the bag 27 would be advantageously resiliently clamped to an endless belt 55 supported by the rollers 42, which serves to impart the driving force to said bag 27 along the entire length of the idler conveyors 26, 32, 31 in a manner presently to be described. This is so, since the rollers 43 because of the resilient mounting on the pneumatic-spring assembly 46, 46a are free to move between the full line position and the dotted line position of FIGURE 3 in a manner to compensate for any variation in the shape of said bag 27 and even to adjust for a slight variation in the size of the bags 27.

Referring now to FIGURE 4, for an understanding of the operation of the power conveyor 25, it can be seen that the belt 55, which is preferably of the deep ribbed type to improve the frictional engagement properties with the bag 27, is driven by a relatively large diameter drive roller 56 mounted on rigid end face plates 57 by a chain or belt 58 transmitting power from a motor and gear assembly 59 via the pulley or sprocket 60 mounted on one end of the drive roller supporting shaft 60a. The belt 55 continues in engagement with the idler rollers 42 (see FIG. 3) along the full length of the feed path defined by the conveyors 25, 26 and returns to the drive roller 56 through a series of guide rollers 61a, 61b, 61c, 61d and a series of tension-adjusting rollers 62a, 62b, 62c of the over-and-under type that are adjustable through suitable set screws 63 along guideways 64 of roller supporting flanges 65.

Returning now to the description of the idler conveyor 26, it will be remembered that this conveyor's function is to urge the bags 27 into driving relationship with the endless belt 55 of the conveyor 25 and that to accomplish this purpose the conveyor 26 is entirely supported by resilient means in the form of pneumatic-spring assemblies 46 and 46a. According to another feature of this invention, the supporting bars 47 for each pair of the pneumatic-spring assemblies 46, 46a are adjustably mounted in guide slots 66 in such a manner that the elevator of the present invention can accommodate a wide range of bag sizes, as illustrated in FIGURE 5. To effect such an adjustment one merely loosens the bolts 48 to free the bar 47 along the guideway 66 until the idler conveyor 26 is properly positioned for the acceptance of any size bag as exemplified by the full and dotted line representations in FIG. 5 at which time the bolt arrangement is again tightened and the conveying operation can resume on the newly selected series of bags 27.

In order that the adjustment just described can be effected along the curved portion 38 of the conveyors 25, 26, the idler conveyor 25 is provided with an intermediate section 67 along the curved portion that is pivoted at its opposite ends to the adjoining conveyor sections at pivots 68 and 68a. The intermediate section 67 is further provided with tie rods 69, 69a, capable of locking the desired pivoted relationship between the intermediate section 67 and the adjoining sections of the conveyor 26. These tie rods are supplied with suitable nuts 70 at their threaded ends so that the clamping pressure on the bags as they pass through the curved portion of the conveyors 25, 26 can be independently adjusted for maximum operating efficiency. For example, as the conveyor 26 is adjusted from the full line to the dotted line position of FIG. 5, it is desirable to pivot the intermediate section 67 in the clockwise direction around pivot 68 and pivot the lower section of the conveyor 26 in the same direction around pivot 68a in order to maintain the proper clamping pressure on the bags 27 as they move along the feed path defined by the curved portion 38 of the conveyors 25, 26.

The discharge station 36 is illustrated in detail in FIG. 6 to show certain features of this aspect of the present invention. In the embodiment illustrated, the discharge station 36 is positioned at the upper end of the elevator unit B, the idler conveyor 31 terminating short of the power conveyor 30 so that the bag 27 is free to turn through 90° in the manner indicated to discharge along a suitable outfeed chute 75.

To facilitate the discharge operation, the deflector 39 is provided along the terminal end of the power conveyor 30 and consists of a curved plate 80 adapted to engage the leading edge of the sack 27 and separate same from the conveyor 30 thereby inducing the turning operation about the end of the idler conveyor 31. Proper positioning of the deflector 39 is accomplished through the use of a cross-bar 81 engaging the upper, cross-ties 23. The lower edge of the deflector plate 80 has a pair of depending flanges 82 which cooperate with suitable retaining means in the form of opposed locking members 83 on the power conveyors 30 which are designed to retain the deflector 80 in the proper position during operation.

Having now described the operation of the device according to the invention, reference is now made to FIGURE 7 to illustrate a particular environment in which the apparatus of the present invention is particularly useful although it is to be understood that this apparatus can be used in any instance where it is desired to change the elevation of a series of articles in the manner described. Thus, the portable elevator assembly 1 can be positioned in the hold of a ship, generally represented by the reference numeral 90 in order to unload various stacks of bags 91 and 92. The unloading of the stack 91 in the lower hold is accomplished first using the illustrated embodiment of the elevator assembly 1 having the lower elevator unit A and the upper elevator unit B in stacked relationship, as shown in the full line illustration in the figure.

When the lower hold is empty, the elevator assembly 1 is raised to the intermediate level for operation on the stack 92. In this position, the upper elevator unit B is conveniently removed since the distance through which the bags from the stack 92 must be raised is only one story and only the elevator unit A as shown in the dotted line position of FIGURE 7 is required. As will be realized, the elevator unit A is quickly converted to discharge the bags at the top thereof by merely removing the auxiliary section 32 and placing the bag deflector 80 along the upper cross-tie 15 (see FIG. 1) in order to form the discharge station 36 at this point.

Alternatively, in accordance with the present invention, any number of additional upper conveyor units B' (shown in a dotted line outline of FIG. 7) can be stacked on top of the upper unit B so that, for example, the bags in the stack 91 in the lower hold can be conveyed to a height of an additional story if desired. This conversion is effected by merely adding the auxiliary conveyor section 32 to the top of conveyor 31 and interconnecting the conveyor units B and B' in the manner described with relation to the conveyor units A and B.

The structure described thus provides an elevator which is very versatile and capable of very efficient use in the transfer of a successive series of articles from one elevation to another. The opposed conveyors operate in such a manner as to provide maximum efficiency for the conveying operation in that they positively clamp the bags 27 along the feed path so as to minimize slippage and power loss. Further, since each conveyor unit A, B, B' is completely independent of the other not only can any number of units be stacked together to provide the desired height but more efficient use of the power from the motors 59 is obtained through the use of shorter endless belts than would otherwise be required for any given height.

While the embodiment described has related to raising of articles along the feed path, it will be understood by those skilled in the art that the device of the present invention adapts itself to reverse operation whereby the ship 90, for example, could be loaded with the identical elevator by merely reversing the drive of the motors 59 and 30a so that the station 36 becomes a receiving station and the articles are discharged at the station 35 which thus becomes the discharge station in this mode of operation.

In this application, there is shown and described only the preferred embodiment of the invention, but, as aforementioned, it is to be understood that the invention is capable of various changes or modifications within the scope of the inventive concept as expressed by the accompanying claims.

What is claimed is:

1. An elevator for conveying a series of generally flat articles comprising an elongated frame supported in an upright position and forming a shaft for said elevator, a pair of opposed conveyors mounted in said shaft, said conveyors being spaced to define a feed path for said articles, each of said conveyors comprising spaced rigid side frame members and a plurality of transverse idler rollers mounted between said frame members of each conveyor, one of said conveyors being a nondriven idler conveyor, one of said conveyors being a power conveyor having an endless belt positioned in engagement with said rollers along said feed path, drive means for driving said belt, and resilient mounting means for one of said conveyors for urging said conveyor as a whole toward the opposed conveyor whereby said articles along said feed path are clamped in driving engagement with said belt.

2. The combination of claim 1, wherein said resilient mounting means includes a support bar positioned transversely of said frame, a plurality of springs carried by said bar, said springs engaging said frame members of the supported conveyor, and means on said frame for adjustably receiving the ends of said bar for varying the relative position of said conveyors.

3. The combination of claim 2, wherein each of said springs comprises an outer coil member surrounding an inner pneumatic bag, said pneumatic bag being provided with a valve for introduction of pressurized fluid to said bag.

4. The combination of claim 1, wherein said conveyors along the receiving end of said feed path being curved in a gradual arc to turn said articles, said idler conveyor terminating short of said power conveyor at the discharge end of said feed path, and deflecting means at said discharge end for causing the leading edge of said articles to separate from said belt to turn said article for discharge.

5. The combination of claim 4 wherein the curved portion of said idler conveyor comprises a plurality of sections, said sections being pivoted to each other for relative movement, and adjustable means for rigidly fixing the pivotal relationship between said sections.

6. The combination of claim 4, wherein said elevator shaft is vertical and said turns of said article being at least substantially through 90°.

7. An elevator assembly for conveying a series of generally flat articles comprising a plurality of elongated frames supported in end to end relationship in an upright position and forming a shaft for said elevator, a pair of opposed conveyors mounted on each of said frames in said shaft forming a series of opposed in-line conveyors, said opposed conveyors being spaced from each other and the ends of corresponding in-line conveyors in adjoining frames being positioned in juxtaposed relation to define a feed path for said articles, each of said conveyors comprising a pair of spaced, rigid side frame members, roller means mounted between said frame members of each conveyor, one of said conveyors being a nondriven idler conveyor, one of said conveyors of each pair having an endless belt positioned in engagement with said rollers along said feed path drive means for driving each of said belts, the idler conveyors of each pair being connected to each other whereby said feed path is continuous along one side thereof, and resilient mounting means for one of said conveyors for urging same toward the opposed conveyor whereby said articles along said feed path are clamped in driving engagement with said belt.

8. The combination of claim 7, wherein the first pair of in-line conveyors is curved along the receiving end of said feed path in a gradual arc to turn said articles, said idler conveyor of each pair terminating short of said power conveyor at the discharge end, deflecting means at the discharge end of the last pair of in-line conveyors for causing the leading edge of said articles to separate from said belt to turn said article for discharge, and an auxiliary conveyor section connecting the juxtaposed ends of said conveyors.

9. An elevator for conveying a series of generally flat articles comprising an elongated frame supported in an upright position and forming a shaft for said elevator, a pair of opposed conveyors mounted in said shaft, said conveyors being spaced to define a feed path for said articles, each of said conveyors comprising frame members and a plurality of transverse idler rollers mounted between said frame members, one of said conveyors being fixedly mounted to said frame, and having an endless belt positioned in engagement with said rollers along said feed path, drive means for driving said belt, resilient mounting means for the other of said conveyors for urging said other conveyor toward said one conveyor toward said one conveyor whereby said articles along said feed path are clamped in driving engagement with said belt, said conveyors having curved portions along the receiving end of said feed path for curving said feed path in a gradual arc to turn said articles, said resilient mounting means including a support bar positioned transversely of said frame, a plurality of springs carried by said bar, said springs engaging said frame members of said other conveyor in supporting relationship, means on said frame for adjustably receiving the ends of said bar for varying the relative position of said conveyors, said curved portion of said other conveyor comprising an intermediate section and two outer sections, said intermediate section being pivoted at its ends to said outer sections for relative movement between said intermediate and said outer sections, and adjustable means for rigidly fixing the pivotal relationship between said intermediate and said outer sections.

10. The combination of claim 9, wherein each of said springs comprises an outer coil member surrounding an inner pneumatic bag, said pneumatic bag being provided with a valve for introduction of pressurized fluid to said bag.

References Cited by the Examiner

UNITED STATES PATENTS

| 1,629,776 | 5/1927 | Cutler | 198—160 |
| 1,786,779 | 12/1930 | Quick | 198—160 |
| 2,529,620 | 11/1950 | Marnach. | |

FOREIGN PATENTS 926,219  5/1963  Great Britain.

EVON C. BLUNK, *Primary Examiner.*

EDWARD S. SROKA, *Examiner.*